United States Patent Office 3,135,656
Patented June 2, 1964

3,135,656
METHOD OF CONTROLLING BACTERIAL FIRE BLIGHT DISEASE IN LIVING PLANTS

Walter W. Abramitis, Downers Grove, and Richard A. Reck, Hinsdale, Ill., assignors to Armour and Company, Chicago, Ill., a corporation of Delaware No Drawing. Filed June 29, 1962, Ser. No. 206,195
3 Claims. (Cl. 167—33)

This invention relates to the control of bacteria on living plants, and more particularly to the control of fire blight (*Erwinia amylovora*), which has presented serious problems in fruit trees and other plants.

The bacterial disease of fire blight, which has been prevalent for many years in fruit trees, has been unsuccessfully treated with various fungicides, bactericides, etc. for a number of years and today is controlled only by the use of expensive bactericides. We have discovered that the disease can be completely controlled through the use of inexpensive water-soluble material on the growing trees without injury to the trees with 100% control of the disease.

A primary object, therefore, of the invention is to provide a method of control of fire blight on living plants. A further object is to provide a method whereby fire blight on fruit trees and other living plants may be controlled without phytotoxicity through the application of controlled amounts of the treating compound in water. Other specific objects and advantages will appear as the specification proceeds.

In one embodiment of our invention, we treat living plants having fire blight with a compound having the following formula:

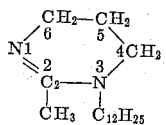

Using the numbering system indicated above, the compound would be named 3-dodecyl-2-methyl 3,4,5,6-tetrahydropyrimidine.

The control is systemic in nature and the compound may be applied to the plant, roots, leaves, or any portion of the plant. We prefer to apply the compound in an aqueous solution, the compound being in the range of 3 to 100 micrograms per milliliter of water. A highly effective range is 20 to 40 micrograms of 3-dodecyl-2-methyl 3,4,5,6-tetrahydropyrimidine per milliliter of water.

Tests were conducted by spraying young pear trees in the greenhouse with tetrahydropyrimidine, as shown in the above formula, and shortly afterward spraying the trees with fire blight inoculum. Trees which received no tetrahydropyrimidine were found to have a 41% infection of fire blight, while the trees which were treated with 3-dodecyl-2-methyl 3,4,5,6-tetrahydropyrimidine in the proportion of one-half pound of the compound to 100 gallons of water were found to have no infection (100% control). Good results may be obtained also by treating with coco-substituted tetrahydropyrimidine. The foregoing procedure is effective in the treatment of fire blight on apple and peach trees and bacterial diseases of peppers and beans, etc.

While in the foregoing specification we have set out procedural steps in considerable detail for the purpose of illustrating embodiments of the invention, it will be understood that such details may be varied widely by those skilled in the art without departing from the spirit of our invention.

We claim:

1. A method for controlling the growth of *Erwinia amylovora* in fruit trees without producing phytotoxicity, comprising applying to a diseased tree an aqueous solution of from 20 to 40 micrograms per milliliter of water of 3-dodecyl-2-methyl 3,4,5,6-tetrahydropyrimidine.

2. A method for controlling bacterial fire blight in plants without producing phytotoxicity, comprising applying to a diseased plant an aqueous solution of from 3 to 100 micrograms of 3-dodecyl-2-methyl 3,4,5,6-tetrahydropyrimidine per milliliter of water.

3. A method for preventing bacterial fire blight in fruit trees without producing phytotoxicity, comprising applying to said trees an aqueous solution of from 3 to 100 micrograms of 3-dodecyl-2-methyl 3,4,5,6 - tetrahydropyrimidine per milliliter of water.

References Cited in the file of this patent

UNITED STATES PATENTS

| | | |
|---|---|---|
| 2,837,463 | Fosdick et al. | June 3, 1958 |
| 2,965,540 | Darlington | Dec. 20, 1960 |

FOREIGN PATENTS

| | | |
|---|---|---|
| 793,749 | Great Britain | Apr. 23, 1958 |